United States Patent [19]

Röttger et al.

[11] Patent Number: 5,173,547

[45] Date of Patent: Dec. 22, 1992

[54] COPOLYMERS CONTAINING PERFLUOROALKYLS

[75] Inventors: Jutta Röttger, Cologne; Wilfried Kortmann, deceased, late of Nachrodt-Wiblingwerde, by Margot Kortmann, Bettina Kortmann, Axel Kortmann, heirs; Karl-Erwin Piejko, Bergisch-Gladbach; Gerd F. Renner, Cologne, all of Fed. Rep. of Germany

[73] Assignee: Bayer Aktiengesellschaft, Leverkusen, Fed. Rep. of Germany

[21] Appl. No.: 592,033

[22] Filed: Oct. 2, 1990

[30] Foreign Application Priority Data

Oct. 17, 1989 [DE] Fed. Rep. of Germany ....... 3934543

[51] Int. Cl.$^5$ ............ C08F 14/18; C08F 214/18; C08F 283/00; C08L 61/28
[52] U.S. Cl. ..................... 525/518; 525/219; 526/246; 526/247; 526/292.3; 526/292.9; 526/320; 526/321
[58] Field of Search ............. 525/518, 519, 326.2; 526/246, 247, 245, 292.1, 292.3, 292.9, 320, 321

[56] References Cited

U.S. PATENT DOCUMENTS

| | | | |
|---|---|---|---|
| 3,379,693 | 4/1968 | Hostettler et al. | 525/440 |
| 4,742,140 | 5/1988 | Greenwood et al. | 526/245 |
| 4,879,367 | 11/1989 | Piejko et al. | 528/371 |
| 4,997,873 | 3/1991 | Süling et al. | 524/458 |
| 4,997,893 | 3/1991 | Süling et al. | 525/517.5 |

Primary Examiner—James J. Seidleck
Assistant Examiner—W. R. H. Clark
Attorney, Agent, or Firm—Sprung Horn Kramer & Woods

[57] ABSTRACT

Copolymers and graft copolymers of perfluoroalkylacrylates or methacrylates and esters of the general formula (I) or (II)

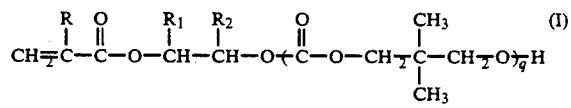

or

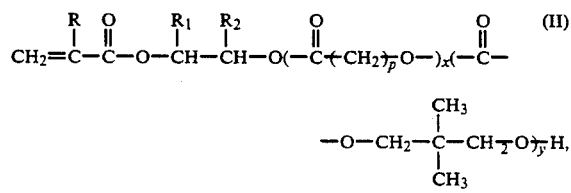

wherein
R, $R_1$ and $R_2$ denote hydrogen or methyl,
p denotes 2 to 6,
q denotes 2 to 200 and
x and y denote 3–30, are outstandingly suitable for finishing textile materials, leather and paper.

8 Claims, No Drawings

COPOLYMERS CONTAINING PERFLUOROALKYLS

The invention relates to copolymers and graft copolymers of perfluoroalkylacrylates or methacrylates and esters of the general formula (I) or (II)

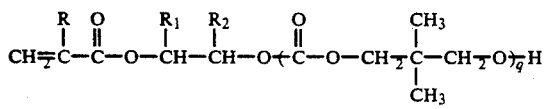

or

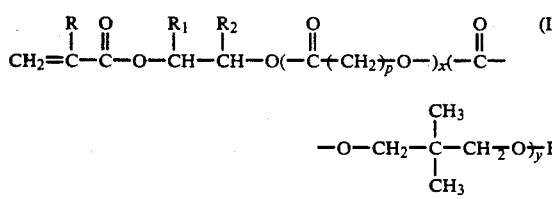

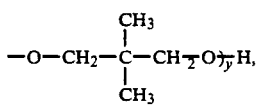

wherein—independently of one another
R, $R_1$ and $R_2$ denote hydrogen or methyl,
p denotes 2 to 6,
q denotes 2 to 200 and
x and y denote 3–30,
their preparation and their use for finishing textile materials, leather and paper.

Perfluoroalkyl(meth)acrylates are preferably understood as meaning compounds of the general formulae

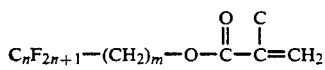

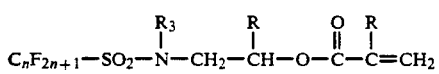

and

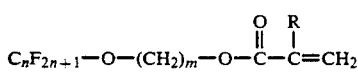

wherein
R denotes hydrogen or methyl,
$R_3$ denotes H or $C_1$–$C_6$-alkyl,
m denotes 1 to 4 and
n denotes 6 to 12.

Of the esters of the formula (I), those where R=hydrogen or methyl, $R_1=R_2=$hydrogen and q=8 to 30 are preferred.

Of the esters of the formula (II), those where R=hydrogen or methyl, $R_1=R_2=$hydrogen and p=5 and which have the combinations
$x \approx y \approx 5$ or
$x \approx y \approx 10$ or $x \approx 7.5$, $y \approx 5$ or
$x \approx 15$, $y \approx 10$
are preferred.

The esters of the general formula (I) are described, for example, in DE 3,723,194 and U.S. Pat. No. 4,879,367.

Esters of the general formula (II) are described in U.S. Pat. No. 3,379,693.

The comonomers (III) to (V), the polymers prepared therefrom and their use for oil- and water-repellent finishing of textiles are known, inter alia, from U.S. Pat. Nos. 3,403,122, 3,847,657, 3,916,053 and 3,919,183.

The use of alkyl(meth)acrylates as comonomers in the preparation of perfluoroalkylcopolymers and the use of these copolymers for textile finishing is already known and is described, for example, in U.S. Pat. Nos. 2,803,615 and 3,062,765.

Using these perfluoroalkyl copolymers, a further improvement in the oleophobic/hydrophobic properties can be achieved only by increasing the fluorine-containing component in the copolymer dispersion. However, the price of these advantages is disadvantages such as hardening and sticking, which have an adverse affect on the handle of the textiles treated with these products.

It is also known that polar comonomers can be used for the preparation of perfluoroalkyl copolymers. For example, U.S. Pat. No. 4,557,837 describes the synthesis of specific methanol-soluble perfluoroalkyl polymers by copolymerization of perfluoroalkyl(meth)acrylates and those polar comonomers which effect solubilization of the copolymers in methanol. Examples of such comonomers are acrylic acid esters or methacrylic acid esters esterified with glycols such as ethylene glycol or triethylene glycol. These perfluoroalkylacrylate copolymers are suitable for oleophobic finishing of textiles, but not for a simultaneous hydrophobic finishing.

There was therefore the object of providing highly effective finishing compositions which have an oleophobizing and hydrophobizing effect at the same time and do not have the disadvantages described.

Surprisingly, it has now been found that the copolymers according to the invention, which are prepared using the esters (I) or (II), are excellently suitable for simultaneous hydrophobizing and oleophobizing. In addition, an improvement in the oleophobic, but above all the hydrophobic, properties can be achieved if the esters (I) or (II) are used as comonomers, in comparison with fluorine-containing copolymers which are prepared without using esters of the general formula (I) or (II), without the content of fluorine-containing component in the latex having to be increased.

Copolymers having specific properties can be obtained by copolymerization of the esters (I) or (II) and the perfluoroalkyl(meth)acrylates (III to V) with other olefinically unsaturated copolymerizable monomers. Such olefinically unsaturated comonomers can be copolymerized in amounts of, for example, up to 65% by weight. Examples of such comonomers are styrene, acrylonitrile, vinylacetate and acrylic and methacrylic acid esters which are derived from aliphatic alcohols having up to 22 carbon atoms. Examples of these alcohols are n-butanol, isobutanol and ethylhexyl, lauryl, stearyl, behenyl and oleyl alcohol.

The glass transition temperatures and therefore the film formation tendency and temperature, for example, can be influenced in the desired manner by copolymerizing these monomers.

The copolymers according to the invention can also be in the form of graft copolymers which are prepared from the comonomers described above using known grafting bases.

The graft copolymerization using perfluoroalkyl(meth)acrylates in aqueous emulsion is known, for example, from DE 3,407,361 and 3,407,362.

Hydrophobic polymers in the form of aqueous dispersions are particularly suitable as grafting bases.

Examples of such grafting bases are melamine polycondensates. They can be obtained, for example, by polycondensation of methylolaminotriazines, etherification or esterification products thereof with carboxylic acids and primary or secondary amines. They are described, for example, in DE 956,990.

The preferred weight ratio of the comonomers (I) or (II) to the perfluoroalkylmonomers (III), (IV) and/or (V) in the copolymers according to the invention is 1:1.5 to 6, in particular 1:2.5 to 4.5.

The proportion of the monomers in the copolymers according to the invention is 5 to 35% by weight, preferably 8 to 20% by weight, of the esters (I) and (II), 15 to 65% by weight, preferably 25 to 55% by weight, of the perfluoroalkyl monomers (III), (IV) and/or (V), and 0 to 65% by weight, preferably 35 to 60% by weight, of other olefinically unsaturated copolymerizable monomers.

The copolymers according to the invention are prepared in solution, dispersion or emulsion. It may be advantageous to use auxiliary solvents, which are described, for example, in U.S. Pat. No. 3,062,765, in the copolymerization. It is furthermore possible to use water-immiscible auxiliary solvents, such as ethyl acetate or chlorofluorohydrocarbons. It may be advantageous to carry out the polymerization with exclusion of oxygen or air, that is to say using inert gases. If auxiliary solvents are used, it is necessary to remove the auxiliary solvents by distillation when the polymerization has ended.

The copolymerization is initiated by known initiators or initiative systems which form free radicals, such as peroxides, aliphatic azo compounds or redox systems. In general, it is advantageous to choose a ratio of the amount of starter to monomer mixture of 0.2 to 0.4:100, preferably 0.3 to 0.35:100.

The polymerization temperature depends on the particular initiator system. The polymerization is in general carried out at temperatures of 40° to 110° C. Specific redox systems also enable the polymerization already to be carried out at 25° C.

A particularly preferred embodiment of the copolymerization according to the invention is polymerization in aqueous dispersion or emulsion. Dispersing agents or emulsifiers are used as auxiliaries in this procedure.

Polyvinyl alcohols or cellulose derivatives, such as cellulose esters or cellulose ethers, are preferably suitable as dispersing agents.

Either nonionic, anionic or cationic emulsifiers can be used as emulsifiers. It is particularly advantageous to use mixtures of either anionic and nonionic emulsifiers or cationic and nonionic emulsifiers.

The amounts of emulsifier are within the known limits.

Examples of nonionic emulsifiers are polyglycol ethers, for example ethyleneoxide/propyleneoxide block polymers or copolymers as well as alkoxylation products, in particular ethoxylation products, of fatty alcohols, alkylphenols, fatty acids, fatty acid amides and sorbitol monooleate. Examples of cationic emulsifiers are quarternary ammonium or pyridinium salts, for example stearyldimethylbenzyl ammonium chloride or N,N,N-trimethyl-N-perfluorooctanesulphonamidopropylammonium chloride.

The copolymers according to the invention are preferably used in the form of aqueous dispersions for the hydrophobic/oleophobic finishing.

Naturally occurring and synthetic materials, such as fibres, filaments, yarns, webs and woven and knitted fabrics, in particular carpets, made of, in particular, cellulose and its derivatives, and also of polyester, polyamide and polyacrylonitrile materials, wool or silk, can successfully be given an oleophobic and hydrophobic finish using the copolymers according to the invention.

For finishing carpets, the copolymers and graft copolymers according to the invention are employed in the form of aqueous dispersions, preferably in combination with aqueous colloidal suspensions of organosilsesquioxanes, such as are described in DE 3,307,420, and if appropriate additionally in combination with other fluorine-containing dispersions.

Finishing is carried out by known processes, for example by the exhaust or pad-mangling process, for example between room temperature and 40° C., but also by slop-padding or spraying with subsequent heat treatment at 80° to 180° C., preferably 120° to 150° C.

Combined oleophobic/hydrophobic finishing of naturally occurring and synthetic materials is possible using the copolymer systems according to the invention. The use according to the invention of the esters (I) and (II) as comonomers moreover makes possible an improvement in the oleophobic/hydrophobic properties, without the content of perfluorinated components in the latex having to be increased in the usual manner, which means that disadvantages such as sticking and hardening and the associated poor handle on the textiles finished with these products are avoided.

EXAMPLE 1 a) Preparation of a Polycondensate Which Can Be Used as a Grafting Base 1.5 mol of behenic acid are melted, and 1 mol of melamine-hexamethylol-pentamethyl ether and 0.9 mol of N-methyldiethanolamine are simultaneously added in the course of 30 minutes. The melt is brought to 150° C. during this addition, and is kept at this temperature for 3 hours.

The same amount by weight of a paraffin of melting point 52° C. is then introduced into the melt. b) Preparation of a Graft Copolymer Dispersion Using A Monomer of the Formula (I)

The following solutions are prepared at 50° C.:
Solution 1
780.0 parts by weight of deionized water
4.54 parts by weight of an ethoxylated nonylphenol containing 10 ethylene oxide units
1.8 parts by weight of benzyldodecyldimethylammonium chloride
Solution 2
300 parts by weight of ethyl acetate
57.5 parts by weight of N-methyl-N-perfluorooctoanesulphfonamidoethyl methacrylate
29.5 parts by weight of stearyl methacrylate
23.8 parts by weight of vinyl acetate
20.0 parts by weight of monomers of the formula (I) where $q \approx 15$, $R \approx H$, $R_1$, $R_2 = H$
The following solution is prepared at 30° C.:
Solution 3
0.656 parts by weight of t-butylperpivalate
0.925 parts by weight of dilauryl peroxide
5.0 parts by weight of ethyl acetate Solutions 1 and 2 are emulsified at 50° C. The resulting emulsion is introduced into a reactor fitted with a stirrer, reflux condenser and internal thermometer and is allowed to cool to 30° C. Solution 3 is added up to 30° C., while stirring, and the temperature is increased from 30° to 50° C. in the course of 1 hour and from 50° to 70° C. in the course of a further hour.

The reaction mixture is then left at 70° C. for 2 hours. The temperature is subsequently kept at 70° to 80° C. for 2 hours, during which the ethyl acetate is distilled off over an additionally attached distillation apparatus, and the mixture is subsequently stirred at 80° C. for a further hour.

Solids content: 15.0%
Fluorine content in the solid: 19.6%
Average particle size: 236 nm
(by light scattering).

EXAMPLE 2

Preparation of a Graft Copolymer Dispersion Without Using a Monomer of the Formula (I)

The following solutions are prepared at 50° C.:
Solution 1: as described in Example 1b),
Solution 2: as described in Example 1b), but without monomer 1.

The following solution is prepared at 30° C.:
Solution 3: as described in Example 1b).

The solutions are then reacted by the process described in Example 1b).

Solids content: 13.0%
Fluorine content in the solid: 21.3%
Average particle size: 221 nm
(by light scattering)

EXAMPLE 3

Preparation of a Graft Copolymer Dispersion Using a Monomer of the Formula (I)

1st stage: Preparation of the pre-latex
The following solutions are prepared at room temperature:
Solution 1
1323 parts by weight of deionized water
19.2 parts by weight of an ethoxylated nonylphenol containing 20 ethylene oxide units
12.6 parts by weight of benzyldodecyldimethylammonium chloride
Solution 2
231.6 parts by weight of ethyl acetate
38.4 parts by weight of diethyl succinate
316.8 parts by weight of stearyl methacrylate
316.8 parts by weight of isobutyl methacrylate
Solution 3
3.6 parts by weight of t-butylperpivalate
3.6 parts by weight of ethyl acetate A mixture is prepared from solutions 1 and 2 and this is emulsified seven times at 50° C. The resulting emulsion is introduced into a reactor provided with a stirrer, reflux condenser and internal thermometer. Solution 3 is added at 50° C., while stirring. The mixture is stirred at 50° to 60° C. for a further half an hour, subsequently stirred at 60° to 70° C. for half an hour and then kept at 70° C. for 2 hours. The reaction mixture is then allowed to react under reflux at about 78° C. for 3 hours. A pre-latex having a solids content of 29.7% is obtained.

2nd stage: Preparation of the graft copolymer dispersion
The following solutions are prepared at 50° C.:
Solution 1
268.0 parts by weight of the pre-latex from stage 1
4.1 parts by weight of an ethoxylated nonylphenol containing 10 mol of ethylene oxide
4.16 parts by weight of benzyldodecyldimethylammonium chloride
498.0 parts by weight of deionized water
Solution 2
332.0 parts by weight of ethyl acetate
38.6 parts by weight of N-methyl-N-perfluorooctanesulphonamidoethyl methacrylate
11.3 parts by weight of stearyl methacrylate
16.4 parts by weight of vinyl acetate
12.0 parts by weight of monomer of the general formula
The following solution is prepared at 30° C.:
Solution 3
0.815 parts by weight of dilauryl peroxide
5 parts by weight of ethyl acetate
0.238 parts by weight of tert.-butylperpivalate Solutions 1 and 2 are combined and are homogenized at 50° C. The resulting emulsion is introduced into a reactor fitted with a stirrer, reflux condenser and internal thermometer and is allowed to cool to 30° C. Solution 3 is added, while stirring, and the mixture is stirred at 30° to 40° C. for one hour.

The mixture is then heated to 60° to 70° C. and allowed to react in this temperature range for one and a half hours. The temperature is then increased to 70° to 80° C., during which the ethyl acetate is distilled off over an additionally attached distillation apparatus in the course of 3 hours. The mixture is subsequently stirred at 83° to 85° C. for a further 3 hours.

Solids content: 19.8%
Fluorine content in the solid: 11.7%
Average particle size: 352 nm
(by light scattering)

EXAMPLE 4

Preparation of a Copolymer Dispersion Using a Monomer of the Formula (II)

The following solutions are prepared at 40° C.:
Solution 1
800 parts by weight of deionized water
5 parts by weight of an ethoxylated lauryl alcohol containing 12 ethylene oxide units
7.5 parts by weight of benzyldodecyldimethylammonium chloride
Solution 2
300 parts by weight of ethyl acetate
41.1 parts by weight of N-methyl-N-perfluorooctanesulphonamidoethyl methacrylate
20.5 parts by weight of stearyl methacrylate
20.5 parts by weight of behenyl acrylate
28.45 parts by weight of isobutyl methacrylate
28.45 parts by weight of butyl acrylate
14 parts by weight of monomer of the formula (II) where $R_1$, $R_2=H$, $R=H$, $R=CH_3$, $y \approx z \approx 10$.
Solution 3
1.5 parts by weight of t-butylperpivalate
1.5 parts by weight of dilauryl peroxide
2.0 parts by weight of ethyl acetate Solutions 1 and 2 are emulsified. The resulting emulsion is introduced into a reactor fitted with a stirrer, reflux condenser and internal thermometer. Solution 3 is added at 40° C., while stirring, and the temperature is increased to 70° C. in the course of half an hour. The reaction mixture is allowed to react at this temperature for 2 hours and is then heated to 70° to 80° C. and left in this temperature range for a further 2 hours, during which the ethyl acetate is distilled off over an additionally attached distillation apparatus. The mixture is then subsequently stirred at 80° C for a further hour.
Solids content: 15.8%
Fluorine content in the solid: 13.5%
Average particle size: 237 nm
(by light scattering)

EXAMPLE 5

Preparation of a Copolymer Dispersion Using Compounds of the Formula (I)

The following solutions are prepared at 40° C.:
Solution 1:
As described in Example 4.
Solution 2:
As described in Example 4, but replacing the compound of the formula (II) by a compound of the formula (I) where R, $R_1$, $R_2$=H and $q \approx 30$.
Solution 3:
As described in Example 4.

The solutions are then reacted by the process described in Example 4.
Solids content: 15.4%
Fluorine content in the solid: 13.5%
Average particle size: 240 nm
(by light scattering)

EXAMPLE 6

Preparation of a Copolymer Dispersion Omitting the Compounds of the Formula (II)

The following solutions are prepared up to 40° C.:
Solution 1:
As described in Example 4.
Solution 2:
As described in Example 4, but without the monomer (II).
Solution 3:
As described in Example 4.

The solutions are then reacted by the process described in Example 4.
Solids content: 14.9%
Fluorine content in the solid: 14.8%
Average particle size: 492 nm
(by light scattering)

EXAMPLE 7

Examples of the Use of the Copolymers According to the Invention

An aqueous dispersion is prepared according to Example 4. 15 parts by weight of this dispersion are mixed with 15 parts by weight of another fluorine-containing dispersion (AG 800, Asahi Glass) and 70 parts by weight of an aqueous colloidal suspension of organosilsesquioxanes, such as are described in DE 3,307,420.

A 2.5% strength aqueous dilution of this mixture is applied (spray application) to a polyamide carpet (tufted goods of 30% residual moisture, pile weight: 500 g/m²) so that an add-on level of 1% by weight of the abovementioned mixture (based on the pile weight) remains on the carpet.

The carpet is then dried at 125° to 150° C. for 5 to 15 minutes and condensation is carried out, and the relative atmospheric humidity, and the technological application tests are performed. The results can be seen from Table 1.

Dispersions prepared according to Example 1b), 2, 3, 5 and 6 are used analogously. The technological results obtained can likewise be seen from Table 1.

TABLE 1

| | Oleophobicity[1] | Hydrophobicity[2] |
| --- | --- | --- |
| Example 1b) | 5 | 70/30–60/40 |
| Example 2 | 4–5 | 80/20–70/30 |
| Example 3 | 5 | 60/40–50/50 |
| Example 4 | 6 | 20/80 |
| Example 5 | 5–6 | 20/80 |
| Example 6 | 5 | 40/60–30/70 |

[1] According to AATCC test method 118 (5 better than 4)
[2] Stability to aqueous-isopropanolic solutions (water/isopropanol = 40/60 better than 50/50).

Table 1 shows the technological results which are obtained when the copolymer dispersions prepared according to Example 1b) to 6 are used in the oleophobic/hydrophobic finishing of carpets based on polyamide fibres.

Compared with the copolymer dispersions prepared without using monomers of the formula (I) or (II) (Examples 2 and 6), a significant improvement in the oleophobizing and hydrophobizing action in the case of copolymerization using such monomers (Examples 1b), 3, 4 and 5) results. The soiling property of the carpets finished with the copolymer dispersions according to the invention is improved and meets increased requirements.

We claim:

1. Copolymers or graft copolymers of perfluoroalkylacrylates or methacrylates and esters of the formula $$CH_2=\overset{R}{\underset{|}{C}}-\overset{O}{\underset{||}{C}}-O-\overset{R_1}{\underset{|}{CH}}-\overset{R_2}{\underset{|}{CH}}-O(-\overset{O}{\underset{||}{C}}-O-CH_2-\overset{CH_3}{\underset{\underset{CH_3}{|}}{C}}-CH_2O)_qH \quad (I)$$

or $$CH_2=\overset{R}{\underset{|}{C}}-\overset{O}{\underset{||}{C}}-O-\overset{R_1}{\underset{|}{CH}}-\overset{R_2}{\underset{|}{CH}}-O(-\overset{O}{\underset{||}{C}}+CH_2\!\!\xrightarrow{}_{\!p}O-)_x(-\overset{O}{\underset{||}{C}}-\\-O-CH_2-\overset{CH_3}{\underset{\underset{CH_3}{|}}{C}}-CH_2O)_yH, \quad (II)$$

wherein—independently of one another
R, $R_1$ and $R_2$ denote hydrogen or methyl,
p denotes 2 to 6,
q denotes 2 to 200
and x and y denote 3 to 30.

2. Copolymers or graft copolymers according to claim 1, characterized in that the perfluoroalkyl(meth)acrylates correspond to the formulae $$C_nF_{2n+1}-(CH_2)_m-O-\overset{O}{\underset{||}{C}}-\overset{R}{\underset{|}{C}}=CH_2 \text{ or} \quad (III)$$

$$C_nF_{2n+1}-SO_2-\overset{R_3}{\underset{|}{N}}-CH_2-\overset{R}{\underset{|}{CH}}-O-\overset{O}{\underset{||}{C}}-\overset{R}{\underset{|}{C}}=CH_2 \quad (IV)$$

or $$C_nF_{2n+1}-O-(CH_2)_m-O-\overset{O}{\underset{||}{C}}-\overset{R}{\underset{|}{C}}=CH_2 \quad (V)$$

wherein
- R denotes hydrogen or methyl,
- $R_3$ denotes H or $C_1$-$C_6$-alkyl,
- m denotes 1 to 4 and
- n denotes 6 to 12.

3. Copolymers or graft copolymers according to claim 1, characterized in that said copolymers or graft copolymers also contain units of other olefinically unsaturated copolymerizable monomers.

4. Graft copolymers according to claim 1, characterized in that the grafting base are melaminepolycondensates.

5. Copolymers or graft copolymers according to claim 1, characterized in that the weight ratio of esters (I) or (II) to perfluoroalkyl(meth)acrylates is 1:1.5 to 6.

6. Copolymers or graft copolymers according to claim 3, characterized in that the content of esters (I) or (II) is 5 to 35% by weight, the content of perfluoroalkyl(meth)acrylates is 15 to 65% by weight and the content of other olefinically unsaturated monomers is 0 to 65% by weight.

7. A copolymer according to claim 6, formed of an ester of formula (I).

8. A copolymer according to claim 7, wherein in ester (I) R, $R_1$ and $R_2$ are H and q is 30.

* * * * *